United States Patent [19]

Westall

[11] 4,417,066

[45] Nov. 22, 1983

[54] SILOXANE QUATERNARY AMMONIUM SALT PREPARATION

[75] Inventor: Stephen Westall, Barry, Wales

[73] Assignee: Dow Corning Limited, Barry, Wales

[21] Appl. No.: 421,619

[22] Filed: Sep. 22, 1982

[30] Foreign Application Priority Data

Oct. 3, 1981 [GB] United Kingdom ............... 8129914

[51] Int. Cl.³ .............................................. C07F 7/10
[52] U.S. Cl. .................................... 556/425; 528/12; 528/18; 528/34; 528/38; 556/423
[58] Field of Search ................................ 556/425, 423

[56] References Cited

U.S. PATENT DOCUMENTS

| | | | |
|---|---|---|---|
| 3,389,160 | 6/1968 | Reid | 556/425 |
| 3,539,605 | 11/1970 | Oberhofer | 556/425 X |
| 3,624,120 | 11/1971 | Yetter | 556/425 |
| 3,658,867 | 4/1972 | Prokai | 556/425 |
| 3,819,675 | 6/1974 | Plueddemann | 556/425 UX |
| 4,352,917 | 10/1982 | Tripp | 556/425 UX |

Primary Examiner—Paul F. Shaver
Attorney, Agent, or Firm—George A. Grindahl

[57] ABSTRACT

Process for the preparation of organosiloxane polymers wherein there are reacted together (A) a silanol-terminated polydiorganosiloxane in which at least 50% of the organic substituents are methyl, and (B) a quaternary ammonium silane

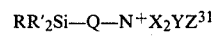

$$RR'_2Si-Q-N^+X_2YZ^{31}$$

wherein R' represents an alkoxy or alkoxyalkoxy group, R represents alkyl, phenyl, vinyl or a group as defined for R', Q represents a divalent group, X represents alkyl, aryl, aralkyl or alkaryl, Y represents a monovalent hydrocarbon group or the group $(-OM)_aOD$, wherein M represents an alkylene group having 2 or 3 carbon atoms, a has a value of from 1 to 20 and D represents H, alkyl or acyl, and Z is a halogen atom.

The organosiloxane polymers can be crosslinked and are useful for the treatment of textiles.

6 Claims, No Drawings

SILOXANE QUATERNARY AMMONIUM SALT PREPARATION

This invention relates to a process for the preparation of novel organosiloxanes.

In U.S. Pat. No. 3,624,120 there are disclosed quaternary ammonium salts of cyclic siloxane polymers. Polydiorganosiloxanes having quaternary ammonium salt groups and in which the remaining substituents are monovalent hydrocarbon groups having up to 18 carbon atoms are disclosed in U.S. Pat. No. 3,389,160. However, such cyclic siloxanes and polydiorganosiloxanes do not contain silicon-bonded reactive groups and are thus not suitable for applications, e.g. the treatment of textiles, where crosslinking of the siloxane is desired.

The present invention is concerned with a method for the preparation of organosiloxane polymers having both quaternary ammonium substituents and silicon-bonded reactive substituents selected from hydroxy, alkoxy and alkoxyalkoxy groups.

According to this invention there is provided a process for the preparation of organosiloxanes which comprises reacting together (A) a silanol-terminated polydiorganosiloxane wherein at least 50 percent of the total substituents are methyl groups, any remaining organic substituents being monovalent hydrocarbon or fluorinated hydrocarbon groups having from 2 to 20 carbon atoms, and (B) an organosilane represented by the general formula $$RR'_2Si-Q-N^+X_2YZ^-$$

wherein R represents an alkyl group having from 1 to 5 carbon atoms, a phenyl group, a vinyl group or a group as defined for R', each R' represents independently an alkoxy or alkoxyalkoxy group having less than 9 carbon atoms, Q represents a divalent group having from 1 to 18 carbon atoms the said group being composed of carbon, hydrogen and, optionally oxygen, any oxygen being present in the form of ether linkages and/or hydroxyl groups, each X represents independently an alkyl, aryl, aralkyl or alkaryl group having from 1 to 12 carbon atoms, Y represents a monovalent hydrocarbon group having from 1 to 22 carbon atoms or the group (—OH)$_a$OD, wherein M represents an alkylene group having 2 or 3 carbon atoms, a has a value of from 1 to 20 and D represents a hydrogen atom, an alkyl group or an acyl group, and Z represents a halogen atom.

The polydiorganosiloxanes (A) employed in the preparation of organosiloxanes according to this invention are those having a hydroxyl group attached to each terminal silicon atom. Such polydiorganosiloxanes are well-known and widely employed in the silicone art. They may be represented by the general formula $$HO\ (R''_2SiO)_nSi(R'')_2OH$$

wherein n is an integer and each R'' represents an organic substituent, and can be prepared for example by the hydrolysis of diorganodichlorosilanes. At least 50 percent of the total silicon-bonded substituents in (A) should be methyl groups, any remaining substituents being monovalent hydrocarbon or fluorinated hydrocarbon groups having from 2 to 20 carbon atoms, for example ethyl, propyl, 2,4,4-trimethylphenyl, cyclohexyl, vinyl, tolyl and trifluoropropyl. The polydiorganosiloxanes may have molecular weights which vary from several hundreds to many thousands. However, the preferred organosiloxane products of this invention are those prepared employing polydiorganosiloxanes (A) having molecular weights (Mn) in the range from about 500 to about 100,000.

In the general formula representing silane (B) R may be for example methyl, ethyl, phenyl or vinyl and R' may be for example methoxy, ethoxy, propoxy or methoxyethoxy. Examples of the divalent group Q are methylene, ethylene, hexylene, xenylene, —CH$_2$CH$_2$OCH$_2$CH$_2$— and —(CH$_2$)$_3$OCH$_2$CH(OH)CH$_2$—. Preferably Q represents —(CH$_2$)$_3$—, —(CH$_2$)$_4$— or —CH$_2$CH.CH$_3$CH$_2$—. The X substituents may be individually any alkyl, aryl, aralkyl or alkaryl group having from 1 to 12 carbon atoms e.g. methyl, ethyl, butyl, amyl, octyl, phenyl, xenyl, benzyl, 2-phenylpropyl, tolyl or 2-ethylphenyl. The substituent Y may be e.g. methyl, ethyl, tetradecyl, octadecyl, —(OCH$_2$CH$_2$)OH, —(OCH$_2$CH$_2$)$_3$OH and —(OCH$_2$CH$_2$)$_3$(OCH$_2$CH$_2$CH$_2$)$_3$OC$_4$H$_9$, and Z is preferably chlorine. The silanes are known materials and can be prepared for example by the reaction of a tertiary amine e.g. C$_{15}$H$_{31}$N(CH$_3$)$_2$ with a haloalkylsilane e.g. chloropropyltrimethoxy silane, or by the addition of an unsaturated tertiary amine to a hydrosilicon compound and reaction of the tertiary amine silane with a hydrocarbyl halide or a hydrogen halide.

Reaction between (A) and (B) involves the interaction of at least one of the silanol groups in (A) with an alkoxy or alkoxyalkoxy group in (B). The reaction can be carried out by heating a mixture of (A) and (B), for example at a temperature of from 60° to 170° C. and for a period of from about 30 minutes to 12 hours. A catalyst for the reaction between SiOH and silicon-bonded alkoxy or alkoxyalkoxy groups may be employed but the reaction normally proceeds at a satisfactory rate in the absence of such a catalyst. If desired the reaction between (A) and (B) may be carried out in the presence of a siloxane equilibration catalyst, or the product of (A) and (B) may subsequently be subjected to siloxane bond rearrangement employing such a catalyst.

Preferably (A) and (B) are reacted together in proportions of from 1 to 2.5 moles of silane (B) per mole of polydiorganosiloxane (A). However, less than 1 and more than 2.5 moles of (B) may be employed depending for example on the quaternary salt group content desired in the product.

The organosiloxane polymers prepared according to this invention are water-soluble when the ratio of hydrocarbon or fluorinated hydrocarbon groups to quaternary salt groups is relatively small, becoming water insoluble as this ratio increases. They can be crosslinked employing conventional organosilicon crosslinking agents, for example organosiloxanes having silicon-bonded hydrogen atoms (such as methylhydrogen polysiloxanes) and silanes and siloxanes having silicon-bonded alkoxy and/or alkoxyalkoxy groups (such as methyltrimethoxysilane, tetraethoxysilane and partial hydrolysates thereof). Cross-linking reactions involving such groups can be facilitated by the use of suitable catalysts including metal salts of organic acids, e.g. stannous octoate, dibutyltin diacetate and lead octoate. Because of their ability to crosslink, the organosiloxane polymers prepared by the process of this invention are suitable as coating materials. They can be applied to textile fibres, if desired in conjunction with other siloxanes, to impart thereto such useful properties as lubricity and soft handle. Textile fibres treated with siloxanes obtained when X has less than about 4 carbon atoms and Y has less than about 16 carbon atoms exhibit improved release of oily soil and resistance to redeposition of such soil during laundering.

The following examples in which Me=methyl illustrate the invention.

EXAMPLE 1

A silanol-terminated polydimethoxysiloxane of average structure $HOMe_2Si(OSiMe_2)_nOSiMe_2OH$ (303.2 g), in which n=approximately 8, and $Me(MeO)_2Si(CH_2)_3N^+Me_2(C_{13}H_{27})Cl^-$ (327.6 g) were heated together under nitrogen for 6 hours at 140°–150° C. Volatiles formed during the reaction were removed under reduced pressure.

The reaction produt was an amber-coloured liquid (628 g) which was water-soluble. The addition of isopropyl titanate to the product produced no increase in viscosity indicating that substantially all of the silanol groups had reacted to provide a polydimethylsiloxane having a methyl group, a methoxy group and a quaternary salt group attached to each terminal silicon atom.

|  | % methoxy |  | % chloride ion |
|---|---|---|---|
| found: | 3.14 | found: | 4.41 |
| calculated | 3.8 | calculated | 4.50 |

A natural, scoured 65/35% polyester/cotton fabric was treated by padding through an aqueous solution of the above prepared siloxane, $MeSi(OMe)_3$ and a tin mercaptide catalyst. The fabric was dried at 80° C. for 10 minutes and then heated at 190° C. for 30 seconds to cure the applied siloxane composition. The concentrations employed in the treating solution were such as to provide on the fabric a pick up of 1% by weight siloxane, 0.25% by weight silane and 0.06% by weight catalyst.

The treated fabric was tested for soil release according to AATCC 130:1977 employing melted butter, liquid paraffin, olive oil and mayonnaise as the soil-producing agents the soils being allowed to set without pressure for 18 hours. The soil release properties were found to be significantly superior to those of the untreated fabric.

EXAMPLE 2

The siloxane reaction product prepared in Example 1 (760 g) and an α, ω-hydroxy terminated polydimethylsiloxane of average molecular weight (Mn) of 740 (370 g) were heated together at 150° C. for 4 hours in the presence of 1% by weight of dibutyltin dilaurate. Volatiles were removed under reduced pressure.

The resulting product was an amber-coloured fluid having a viscosity of 35,000 cS at 25° C. and the theoretical structure

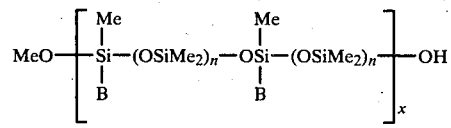

wherein B represents $-(CH_2)_3N^+Me_2C_{13}H_{27}Cl^-$ and n has a value of about 8.

When this copolymer was applied to cotton/polyester shirt fabric as described in Example 1 the fabric treated with the copolymer exhibited superior resistance to oily soiling when compared with the untreated fabric and fabric which had been similarly treated except that the copolymer was replaced by a silanol-terminated polydimethylsiloxane.

That which is claimed is:

1. A process for the preparation of organosiloxanes which comprises reacting together (A) a silanol-terminated polydiorganosiloxane wherein at least 50 percent of the total substituents are methyl groups, any remaining organic substituents being monovalent hydrocarbon or fluorinated hydrocarbon groups having from 2 to 20 carbon atoms, and (B) an organosilane represented by the general formula $$RR'_2Si-Q-N^+X_2YZ^-$$

wherein R represents a group selected from alkyl groups having from 1 to 5 carbon atoms, the phenyl group, a vinyl group and groups as defined for R', each R' represents independently a group having less than 9 carbon atoms selected from alkoxy groups and alkoxyalkoxy groups, Q represents a divalent group having from 1 to 18 carbon atoms the said group being composed of carbon, hydrogen and, optionally, oxygen, any oxygen present being in the form of ether linkages, hydroxyl groups, or both, each X represents independently a group having from 1 to 12 carbon atoms selected from alkyl, aryl, aralkyl and alkaryl groups Y represents a monovalent hydrocarbon group have from 1 to 22 carbon atoms or the group $(-OM)_aOD$, wherein M represents an alkylene group having 2 or 3 carbon atoms, a has a value of from 1 to 20 and D represents a hydrogen atom, an alkyl group or an acyl group, and Z represents a halogen atom.

2. A process as claimed in claim 1 wherein polydiorganosiloxane (A) has a molecular weight within the range from 500 to 100,000.

3. A process as claimed in claim 1 or claim 2 wherein Q represents the group $-(CH_2)_3$, $-(CH_2)_4-$ or $-CH_2CH.CH_3CH_2-$.

4. A process as claimed in claim 1 which also includes the further step of contacting the reaction product of (A) and (B) with a siloxane rearrangement catalyst.

5. A process as claimed in claim 1 when carried out in the presence of a siloxane rearrangement catalyst.

6. A process as claimed in claim 1 wherein the organosiloxane reaction product is subsequently crosslinked by reaction with an organosilicon crosslinking agent.

* * * * *

UNITED STATES PATENT AND TRADEMARK OFFICE
CERTIFICATE OF CORRECTION

PATENT NO. : 4,417,066
DATED : Nov. 22, 1983
INVENTOR(S) : Stephen Westall

It is certified that error appears in the above-identified patent and that said Letters Patent is hereby corrected as shown below:

In the Abstract "$YZ^{31}$" should read -- $YZ^-$ --.

In Column 1, Line 46, "$(-OH)_aOD,$" should read -- $(-OM)_aOD,$ --.

Signed and Sealed this

Sixth Day of November 1984

[SEAL]

*Attest:*

*Attesting Officer*

GERALD J. MOSSINGHOFF

*Commissioner of Patents and Trademarks*